(12) United States Patent
Takagi (10) Patent No.: US 6,327,563 B1
(45) Date of Patent: Dec. 4, 2001

(54) WIRELESS MICROPHONE SYSTEM

(75) Inventor: Yoshiaki Takagi, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/426,751

(22) Filed: Oct. 26, 1999

(30) Foreign Application Priority Data

Nov. 27, 1998 (JP) .................................................. 10-352184

(51) Int. Cl.$^7$ ........................... G10L 19/02; G10L 19/14; G10L 21/02
(52) U.S. Cl. .......................... 704/230; 704/201; 704/270
(58) Field of Search .................................... 704/232, 201, 704/205, 211, 234, 230, 270

(56) References Cited

U.S. PATENT DOCUMENTS

| | | | |
|---|---|---|---|
| 5,040,217 | * 8/1991 | Brandenburg et al. | 704/200.1 |
| 5,062,010 | * 10/1991 | Saito | 386/106 |
| 5,479,562 | * 12/1995 | Fielder et al. | 704/200.1 |
| 5,553,193 | * 9/1996 | Akagiri | 704/200.1 |
| 5,629,976 | * 5/1997 | Loke et al. | 370/280 |
| 5,640,486 | * 6/1997 | Lim | 704/200.1 |
| 5,721,783 | * 2/1998 | Anderson | 381/328 |
| 6,070,140 | * 5/2000 | Tran | 704/275 |

OTHER PUBLICATIONS van der Vreken et al, "A New Subband Perceptual Audio Coder using CELP," Proceedings of the 1998 IEEE International Conference on Acoustics, Speech and SIgnal Processing, May 12–15, 1998.*

Ambikairajah et al, "Auditory masking and MPEG–1 audio compression," Electronics & Communication Engineering Journal, vol. 9 Issue: 4, Aug. 1997.*

Pan, "A tutorial on MPEG/audio compression," IEEE Multimedia, vol. 2 Issue: 2, Summer 1995, Page(s): 60–74.*

* cited by examiner

Primary Examiner—Richemond Dorvil
Assistant Examiner—Daniel A. Nolan
(74) Attorney, Agent, or Firm—Louis Woo

(57) ABSTRACT

In a audio signal coding apparatus, a band separating filter separates a digital audio signal into M bands of audio data. A quantizing circuit quantizes M bands of the audio data. A data grouping circuit groups M bands of the audio data to output N bands of the audio data in accordance with frequency resolution of the human being. M and N being natural numbers more than one, M>N. In an audio signal decoding apparatus, a receiving circuit receives the bit stream including audio data which are grouped into N bands from M bands of audio data which is generated from an audio signal A coded data separating circuit separates N bands of audio data to M bands of the audio data. A de-quantizing circuit for de-quantizes M bands of the audio data. A combining circuit combines M bands of the audio data into an output audio signal. A wireless microphone system using the audio signal coding apparatus and the audio signal decoding apparatus is also disclosed. A method of coding audio data and a method of decoding the audio data are also disclosed.

3 Claims, 8 Drawing Sheets

WIRELESS MICROPHONE SYSTEM

BACKGROUND OF THE INVENTION

1. Field of the Invention

This invention relates to an audio signal coding apparatus, a wireless microphone using the audio signal coding apparatus, an audio signal decoding apparatus, and a wireless microphone system using the audio signal coding apparatus and the audio signal decoding apparatus.

2. Description of the Prior Art

An audio signal coding apparatus for coding an audio signal to output a compressed audio signal, a wireless microphone transmitting a sound signal, and a wireless microphone system including a wireless microphone and a receiver for receiving the transmitted sound signal from the wireless microphone, and an audio signal decoding apparatus for decoding the compressed audio signal are known.

SUMMARY OF THE INVENTION

The aim of the present invention is to provide a superior audio signal coding apparatus, a superior wireless microphone, a superior wireless microphone system, and a superior audio signal decoding apparatus.

According to the present invention, a first audio signal coding apparatus is provided, which includes: a band separating filter for separating a digital audio signal into M bands of audio data; a quantizing circuit for quantizing M bands of the audio data; and a data grouping circuit for grouping M bands of the audio data to output N bands of the audio data. M and N are natural numbers more than one and M>N.

The first audio signal coding apparatus may further include: a magnification determining circuit for detecting maximum levels of M bands of the audio data and determining M bands of magnifications in accordance with M bands of the maximum levels; a normalizing circuit for normalizing M bands of the audio data from the band separating filter in accordance with M bands of the magnifications and supplying normalized M bands of the audio data to the quantizing circuit; a bit assignment determining circuit for determining bit assignment of M bands of the audio data in accordance with M bands of the audio data to generate M bands of bit assignment data supplied to the quantizing circuit, wherein the quantizing circuit quantizes M bands of the audio data in accordance with the bit assignment of M bands of the audio data, the data grouping circuit groups M bands of the audio data, the magnifications, and the bit assignment data into N bands of audio data, magnifications, and bit assignment data. The first audio signal coding apparatus may further include a bit stream forming circuit for generating and outputting a bit stream from N bands of the audio data, the magnifications, and the bit assignment data from the grouping circuit.

According to this invention, there is provided a first audio signal decoding apparatus including: a receiving circuit for receiving a bit stream including audio data which are grouped into N bands from M bands of audio data which is generated from an audio signal, M and N being natural numbers more than one, M>N; a coded data separating circuit for separating N bands of the audio data to M bands of the audio data; a de-quantizing circuit for de-quantizing M bands of the audio data; and a combining circuit for combining M bands of the audio data into an output audio signal.

According to this invention, there is provided a first wireless microphone which includes: a microphone for receiving a sound to generate a sound signal; an a/d converter for a/d-converting the sound signal into audio data; a compressing circuit for compressing the audio data in accordance with frequency resolution of the human being to generate compressed audio data; and a transmitting circuit for transmitting the compressed audio data.

In the first wireless microphone, the compressing circuit may include: a band separating filter for separating audio data into M bands of audio data; a quantizing circuit for quantizing M bands of the audio data; and a data grouping circuit for grouping M bands of the audio data to output N bands of the audio data as the compressed audio data in accordance with frequency resolution of the human being. M and N are natural numbers more than one, M>N.

According to this invention, there is provided a wireless microphone system which includes: a microphone unit including: a microphone for receiving a sound to generate a sound signal; an a/d converter for a/d-converting the sound signal into audio data; a compressing circuit for compressing the audio data in accordance with frequency resolution of the human being to generate compressed audio data; and a transmitting circuit for transmitting the compressed audio data; and a receiving unit including: a receiving circuit for receiving the compressed audio data transmitted by the transmitting circuit; and an expanding circuit for expanding the compressed audio data from the receiving circuit in accordance with the frequency resolution to output expanded audio data.

According to this invention, there is provided a second audio signal coding apparatus which includes: a band separating filter for separating a digital audio signal into M bands of audio data; a bit assignment determining circuit for determining bit assignment and generating M bands of bit assignment data in accordance with M bands of the audio data; a magnification determining circuit for detecting M bands of maximum levels of M bands of the audio data and determining M bands of magnification data in accordance with M bands of the maximum levels; a data grouping circuit for grouping M bands of the magnification data into N bands of magnification data and grouping M bands of the bit assignment data into N bands of assignment data to output N bands of magnification data and N bands of assignment data; a combining circuit for combining M bands of the audio data into N bands of audio data; a normalizing circuit for normalizing N bands of the audio data from the band separating circuit in accordance with N bands of magnification data; and a quantizing circuit for quantizing N bands of the audio data in accordance with N bands of the bit assignment data to output the quantized N bands of the audio data. M and N are natural numbers more than one, M>N.

According to this invention, there is provided a second wireless microphone which includes: a microphone for receiving a sound to generate a sound signal; an a/d converter for a/d-converting the sound signal into audio data; a band separating circuit for separating the audio data into M bands of audio data; a bit assignment determining circuit for determining bit assignment and generating M bands of bit assignment data in accordance with M bands of the audio data; a magnification determining circuit for detecting M bands of maximum levels of M bands of the audio data and determining M bands of magnification data in accordance with M bands of the maximum levels, respectively; a data grouping circuit for grouping M bands of the magnification data into N bands of magnification data and grouping M bands of the bit assignment data into N bands of assignment data to output N bands of magnification data and N bands of assignment data; a combining circuit for combining M bands of the audio data into N bands of audio data; a normalizing circuit for normalizing N bands of the audio data from the band separating circuit in accordance with N bands of magnification data; and a quantizing circuit for quantizing N bands of the audio data in accordance with N bands of the bit assignment data to output the quantized N bands of the audio data. M and N are natural numbers more than one, M>N.

According to this invention, there is provided a third audio signal coding apparatus which includes: a band separating filter for separating a digital audio signal into M bands of audio data; a magnification determining circuit for detecting maximum levels of M bands of the audio data and determining M bands of magnification data in accordance with M bands of the maximum levels; a normalizing circuit for normalizing M bands of the audio data from the band separating filter in accordance with M bands of magnification data; a bit assignment determining circuit for determining bit assignment and generating M bands of bit assignment data in accordance with M bands of the audio data; a quantizing circuit for quantizing M bands of the audio data in accordance with M bands of the bit assignment data to output M bands of the quantized audio data; and a data grouping circuit for grouping M bands of the magnification data into N bands of magnification data and grouping M bands of the bit assignment data into N bands of assignment data to output N bands of magnification data and N bands of assignment data. M and N are natural numbers more than one, M>N.

According to this invention, there is provided a third wireless microphone which includes: a microphone for receiving a sound to generate a sound signal; an a/d converter for a/d-converting the sound signal into an audio data; a band separating filter for separating a digital audio signal into M bands of audio data; a magnification determining circuit for detecting M bands of maximum levels of M bands of the audio data and determining M bands of magnification data in accordance with M band of the maximum levels, respectively; a normalizing circuit for normalizing M bands of the audio data from the band separating filter in accordance with M bands of magnification data, respectively; a bit assignment determining circuit for determining bit assignment and generating M bands of bit assignment data in accordance with M bands of the audio data, respectively; a quantizing circuit for quantizing M bands of the audio data in accordance with M bands of the bit assignment data to output the quantized M bands of the audio data, respectively; and a data grouping circuit for grouping M bands of the magnification data into N bands of magnification data and grouping M bands of the bit assignment data into N bands of assignment data to output N bands of magnification data and N bands of assignment data. M and N are natural numbers more than one, M>N.

According to this invention, there is provided a method of coding audio data which includes the steps of: separating the audio data into M bands of audio data; quantizing M bands of the audio data; and for grouping M bands of the audio data to output N bands of the audio data. M and N are natural number more than one, M>N.

According to this invention, there is provided a method of decoding audio data which includes the steps of: receiving a bit stream including the audio data which are grouped into N bands from M bands of audio data which is generated from an audio signal, M and N being natural numbers more than one, M>N; separating N bands of audio data to M bands of the audio data; de-quantizing M bands of the audio data; and combining M bands of the audio data into an output audio signal.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

<FIRST EMBODIMENT>

Figure 1:
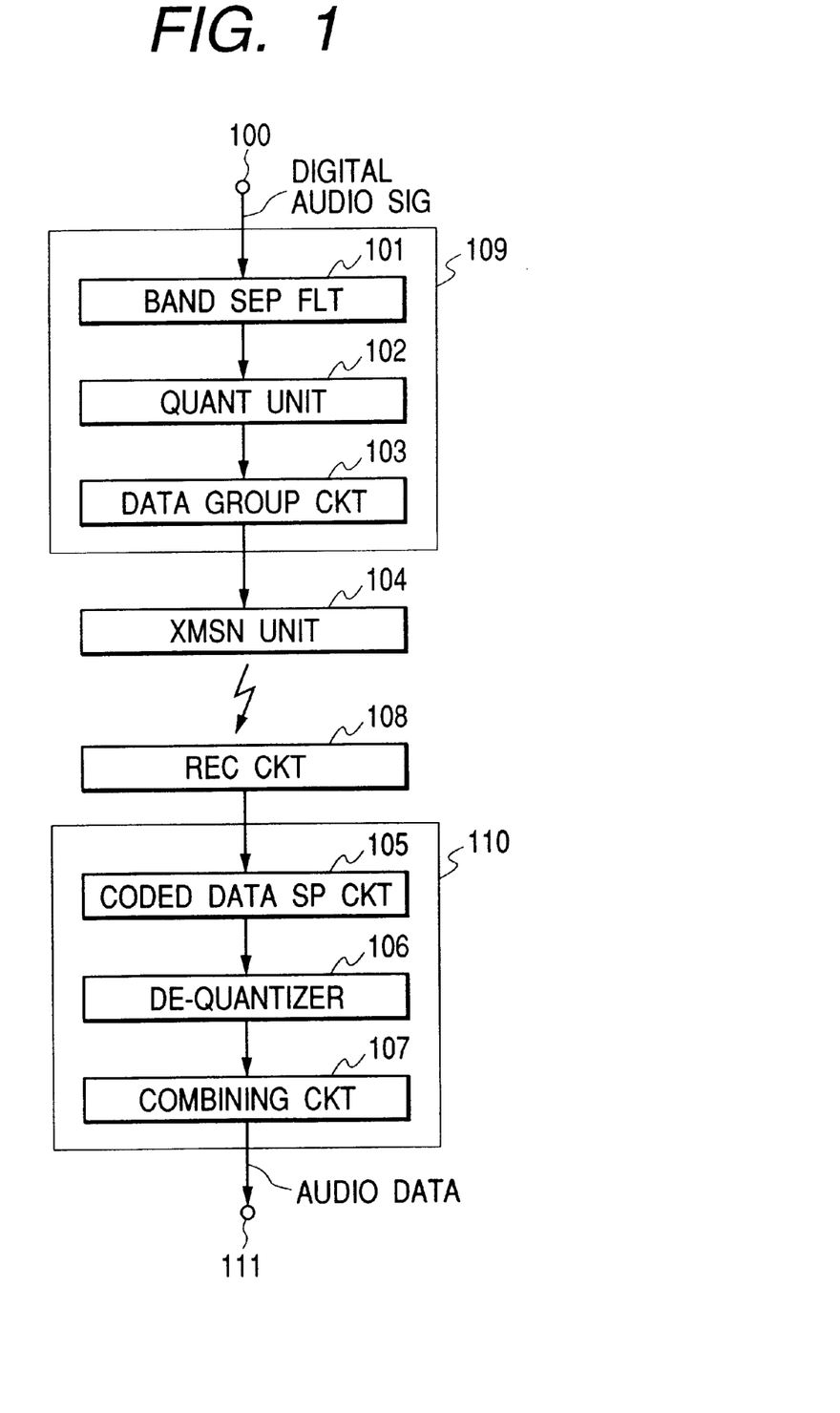
FIG. 1 is a block diagram of a first embodiment showing an audio signal transmission apparatus including an audio signal coding apparatus and an audio signal receiving apparatus including an audio signal decoding apparatus.

FIG. 1 is a block diagram of an audio signal transmission apparatus including an audio signal coding apparatus and an audio signal receiving apparatus including an audio signal decoding apparatus according to the first embodiment.

The audio signal transmission apparatus includes an audio signal coding circuit 109 and a transmission unit 104. The audio signal receiving apparatus includes an audio signal receiving circuit 108 and an audio signal decoding circuit 110.

The audio signal coding circuit 109 of the first embodiment includes a band-separating filter 101 for processing a digital audio signal from an input terminal 100 to provide M bands of audio data separated at a regular frequency interval, a quantizing unit 102 for quantizing the audio data from the band-separating filter 101, a data grouping circuit 103 for grouping the audio data from the quantizing circuit 102 into N bands of audio data in accordance with audio frequency resolution width of the human being. The transmission circuit 104 transmits the audio data from the grouping circuit 103. M and N are natural numbers more than one and M>N.

The receiving circuit 108 receives the transmitted audio data from the transmission circuit 104. The audio signal decoding circuit 110 decodes the audio data from the receiving circuit 108.

The audio data decoding circuit 105 includes a coded data separating circuit 105 for separating the grouped data (N bands of audio data) to provide M bands of audio data separated at the regular frequency interval, a de-quantizing circuit 106 for de-quantizing the audio data from the coded data separating circuit 105, and a combining circuit (filter) 107 for combining the de-quantized audio data separated at the regular interval to provide a combined audio data having a single band.

Figure 2:
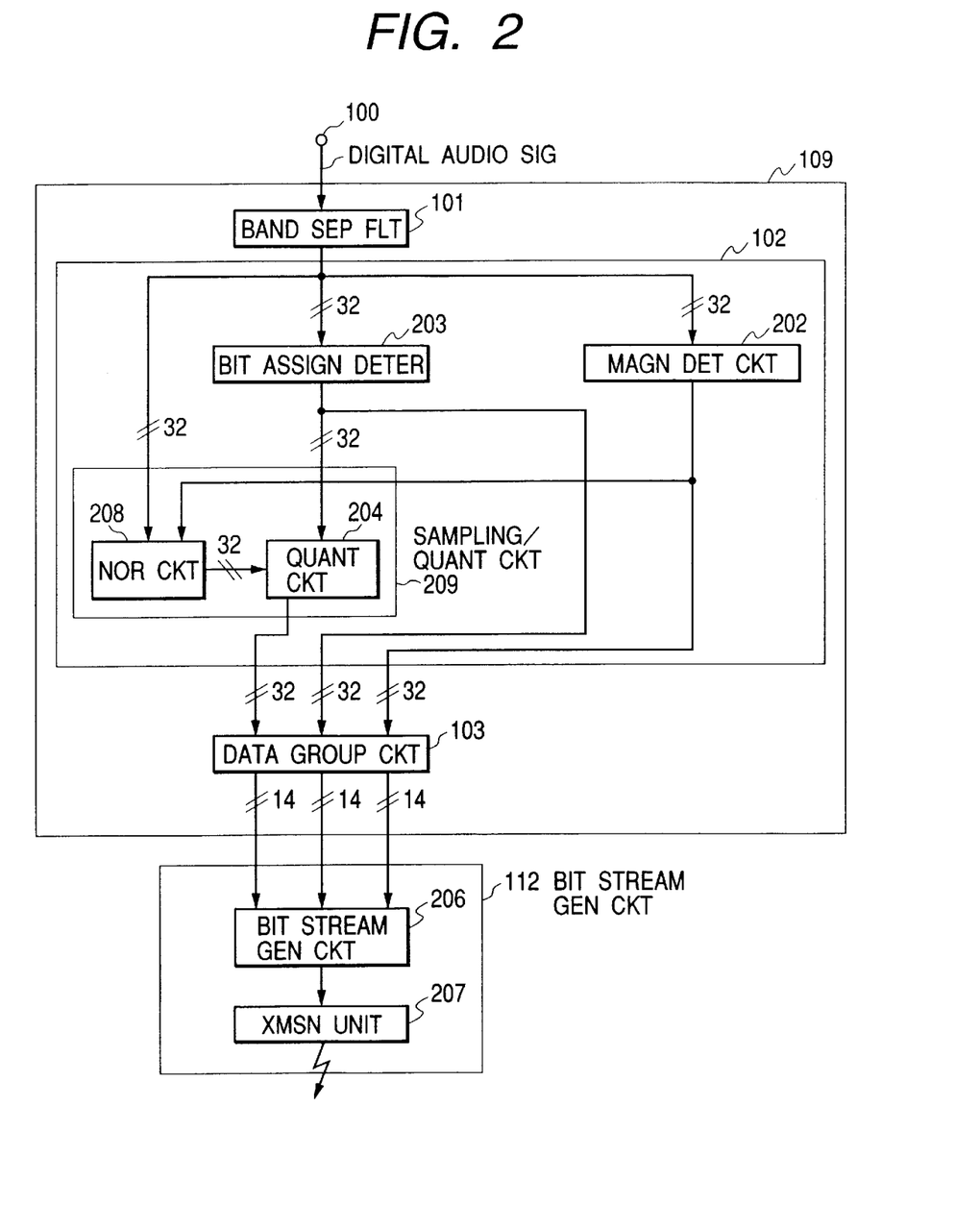
FIG. 2 is a block diagram of the audio signal coding circuit shown in FIG. 1.

FIG. 2 is a block diagram of the audio signal transmission circuit shown in FIG. 1.

FIGS. 3A to 3D are graphical drawings of this invention.

The quantizing unit 102 includes a magnification determining circuit 202 for detecting M bands of maximum levels of M bands of the audio data and determining M bands of magnifications in accordance with M band of the maximum levels, respectively, a bit assignment determining circuit 203 for determining bit assignment and generating M bands of bit assignment data for quantizing in accordance with M bands of the audio data, respectively, a normalizing circuit 208 for normalizing M bands of the audio data from the band separating filter 101 in accordance with M bands of magnifications, respectively, and a quantizing circuit 204 quantizes M bands of the audio data from the normalizing circuit 208 in accordance with the bit assignment, respectively.

The data grouping circuit 103 groups M bands of magnifications (magnification data) into N bands of magnifications, groups M bands of the bit assignment data into N bands of assignment data in accordance with frequency resolution of the human being.

The audio signal coding apparatus further includes a transmission (output) unit 112 including a bit stream generation circuit 206 for generating and outputting a bit stream from N bands of the audio data, the magnifications, and the bit assignment data from the data grouping circuit 103 and a transmission circuit 207 for transmitting the bit stream. The output of the data grouping circuit 103 may be directly used. Moreover, the output of the bit steam generation circuit 206 may be directly used. For example, the bit stream is recorded by an IC memory recorder.

Figures 3A, 3B, 3C:
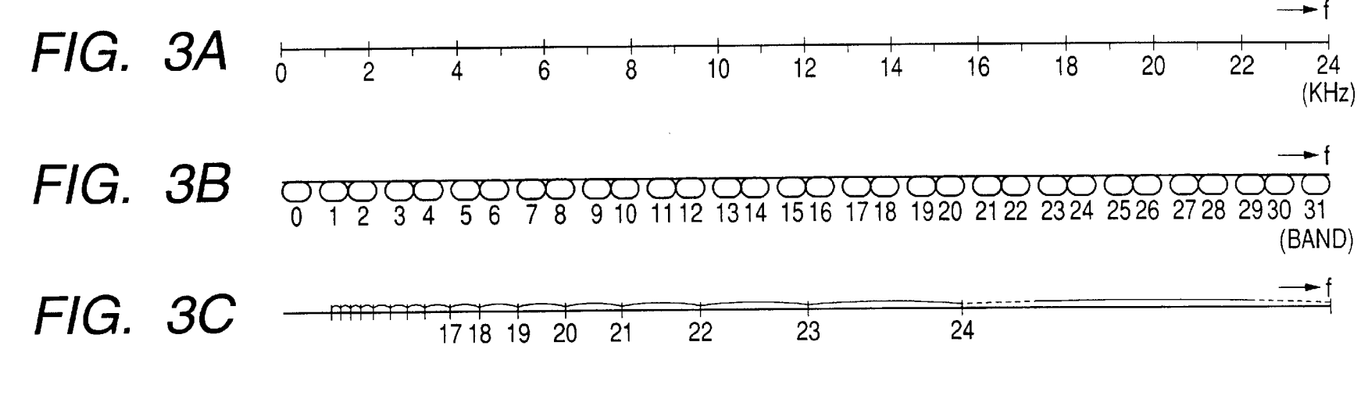
FIGS. 3A to 3D are graphical drawings of this invention.

The band separating filter 101 separates the digital audio signal into thirty-two (M) bands of audio data as shown in FIG. 3B. That is, the audio signal is separated at the regular interval as shown in FIGS. 3A and 3B and outputted as arrangement data including thirty-two elements to supply the arrangement data to the normalizing circuit 208, the bit assignment determining circuit 203, and the magnification determining circuit 202.

The bit assignment determining circuit 203 determines bit assignment from the arrangement data from the band separating filter 201 to output M bands of bit assignment data in accordance with acoustic sensitivity of the human being by calculation. More specifically, the more bits assigned to sound well range of the audio data.

The magnification determining circuit 202 determines magnifications (magnification data) for normalizing from the arrangement data from the band separating filter 201. More specifically, the magnification determining circuit 202 detects maximum sound levels of M bands of the audio data and determines the magnifications in accordance with the maximum sound levels. The normalizing circuit 208 normalizes M bands of the audio data to provide normal distribution in accordance with the detected magnifications.

The quantizing circuit 204 quantizes M bands of audio data from the normalizing circuit 208 in accordance with the bit assignment data from the bit assignment determining circuit 203. The normalizing circuit 208 and the quantizing circuit 204 form a sampling/quantizing circuit 209.

Figure 3D:
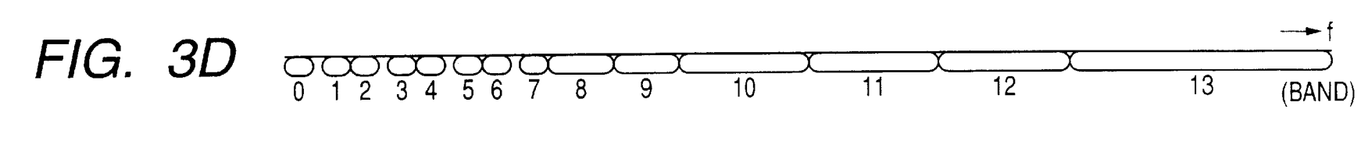

The grouping circuit 103 groups M bands of the audio data from quantizing circuit 102 in accordance with audio frequency resolution width as shown in FIG. 3C to provide fourteen (N) bands of audio data as arrangement data including fourteen elements. That is, for example, the eighth and ninth bands of audio data from the band separating filter 101 shown in FIG. 3B are combined into the eighth band as shown in FIG. 3D in accordance with the frequency resolution of the human being as shown in FIG. 3C. Moreover, twenty-fourth to thirty-first bands shown in FIG. 3B are combined as thirteenth band shown in FIG. 3D. Each band includes the same amount of data, so that the output data of the coded data separating circuit 105 is compressed to reduce redundancy of audio data. A bit stream forming circuit 206 forms a bit stream including the compressed audio data, the compressed bit assignment data, and the compressed magnification data from the coded data grouping circuit 105. The transmission circuit 207 transmits the bit stream data through the transmission line 104.

This operation will be described more specifically with reference to FIGS. 3C and 3D. As shown in FIG. 3C, the hearing sense of the human being is such that the frequency resolution is more coarse with increase in frequency, so that the ideal band width for dividing and combining should be narrow at the low frequency band and wide at the high frequency band. Therefore, in this invention, the band with is made large at the high frequency as shown in FIG. 3D for data compression.

As mentioned, the audio signal coding apparatus according to the first embodiment codes the audio signal in accordance with the hearing sense characteristic, so that the audio signal is transmitted (outputted) at a lower bit rate with decrease in the sound quality suppressed.

An audio signal receiving apparatus includes a receiving circuit 108 and a audio signal decoding circuit 110.

The receiving circuit 108 receives the transmitted bit stream including audio data which are grouped into N bands from M bands of audio data which is generated from the audio signal.

The audio signal decoding circuit 110 includes a coded data separating circuit 105 for separating N bands of audio data to M bands of the audio data, a de-quantizing circuit 106 for de-quantizing M bands of the audio data, and a combining circuit (filter) 107 for combining M bands of the audio data into a single band of audio signal which is outputted at a terminal 111.

If the audio signal coding circuit 109 and the audio decoding circuit 110 are used in the IC memory recorder, the transmission circuit 207 is replaced by a recording circuit (not shown) and the receiving circuit 108 is replaced by a reading circuit (not shown).

<SECOND EMBODIMENT>

Figure 4:
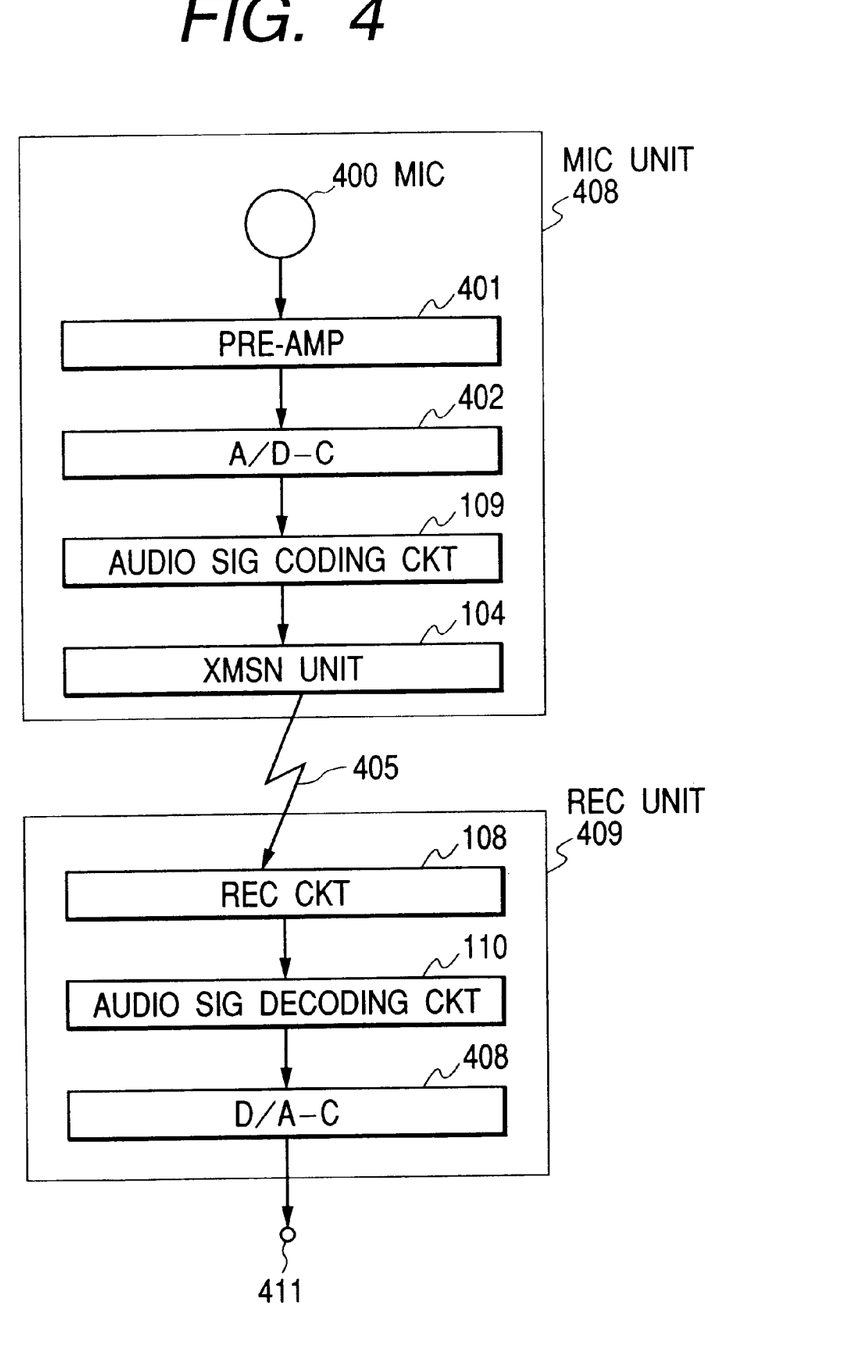
FIG. 4 is a block diagram of a wireless microphone system according to a second embodiment.

FIG. 4 is a block diagram of a wireless microphone system according to a second embodiment.

The wireless microphone system according to the second embodiment includes a microphone unit 408 and a receiving unit 409.

The microphone unit 408 includes a microphone 400 for receiving a sound to generate a sound signal, a pre-amplifier 401 for amplifying the sound signal, an a/d converter for a/d-converting the sound signal from the pre-amplifier 401 into audio data, the audio signal coding circuit 109 for coding and compressing the audio data in accordance with frequency resolution of the human being to generate a compressed audio data, and the transmission unit 104 for transmitting the compressed audio data.

The receiving unit 409 includes the receiving circuit 108 for receiving the compressed audio data transmitted by the transmitting circuit 104, the audio signal decoding circuit 110 for decoding the compressed audio data, that is, expanding the compressed audio data from the receiving circuit 108 in accordance with the frequency resolution to output expanded audio data, and a d/a converter 408*a* for d/a-converting the audio signal from the audio signal decoding circuit 110 which is outputted at a terminal 411 as an analog audio signal.

As mentioned, the wireless microphone system according to the second embodiment is substantially the same as the audio signal coding apparatus and the audio signal receiving apparatus of the first embodiment. The difference is that the microphone 400, the pre-amplifier 401, the a/d converter 402, and the d/a converter 408 are further provided. The transmission path 405 is generally the air. That is, the bit stream is transmitted with a FM radio wave signal. However, other transmission systems such as an optical transmission system or a network are applicable.

The d/a converter 408a may be omitted to output the digital audio signal.

<THIRD EMBODIMENT>

Figure 5:
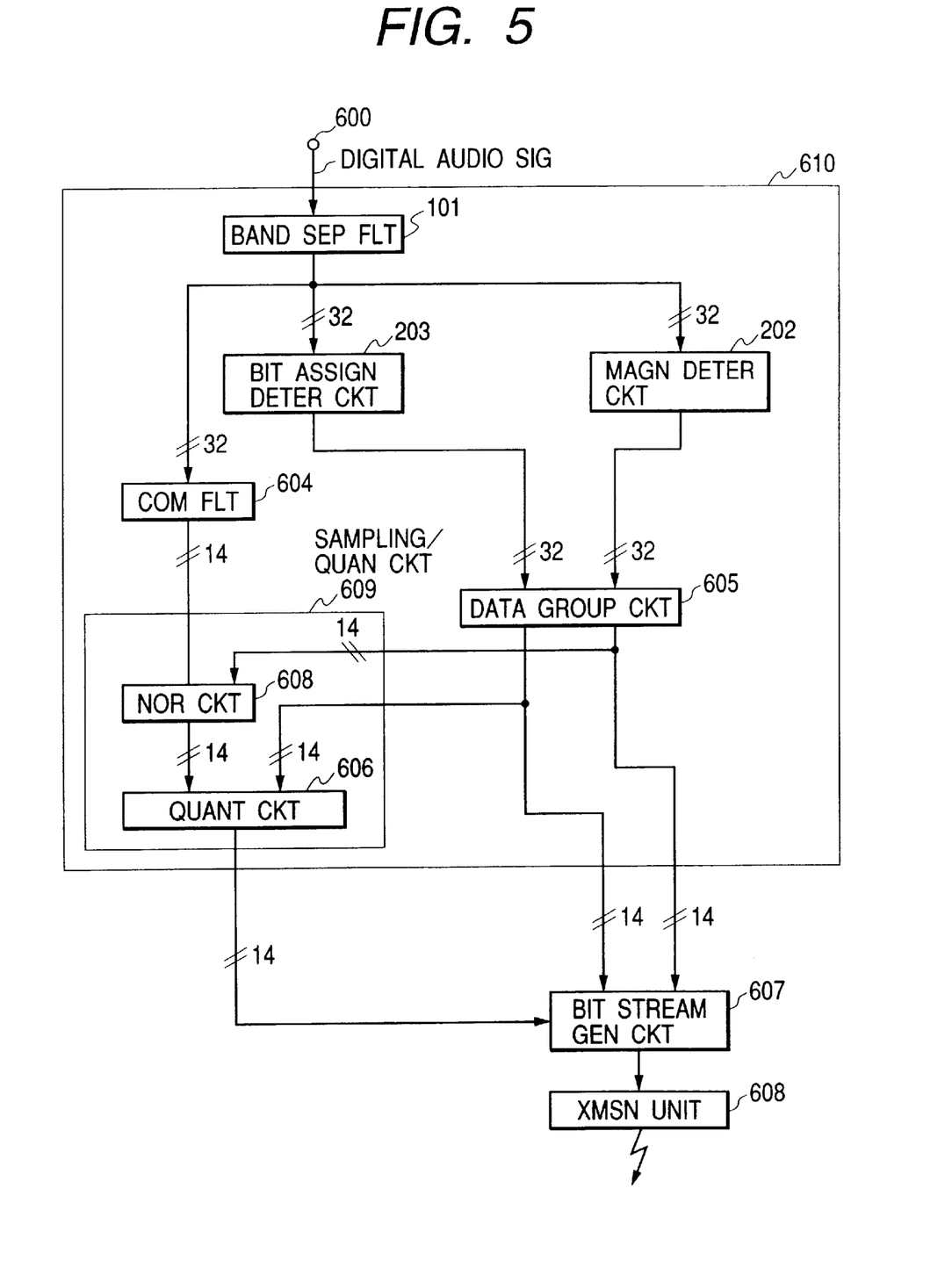
FIG. 5 is a block diagram of an audio signal coding circuit of a third embodiment.

FIG. 5 is a block diagram of an audio signal coding circuit of a third embodiment.

The audio signal coding circuit 610 of the third embodiment includes a band separating filter 101 for processing a digital audio signal from an input terminal 600 to provide M bands of audio data separated at a regular frequency interval, the magnification determining circuit 202 for detecting M bands of maximum levels of M bands of the audio data and determining M bands of magnifications in accordance with M bands of the maximum levels, the bit assignment determining circuit 203 for determining bit assignment and generating M bands of bit assignment data for quantizing in accordance with M bands of the audio data, a combining filter 604 for partially combining M bands of the audio data into N bands of audio data as shown in FIG. 3D, a data grouping circuit 605 for grouping M bands of the bit assignment data into N (14) bands of bit assignment data and grouping M bands of magnifications into N bands of magnifications, a normalizing circuit 608 for normalizing N bands of the audio data from the combining filter 604 in accordance with N bands of magnifications, a quantizing circuit 606 quantizes N bands of the audio data from the normalizing circuit 608 in accordance with N bands of bit assignment data from the data grouping circuit 605. The normalizing circuit 608 and the quantizing circuit 606 form a sampling/quantizing circuit 609.

The data coding circuit of the third embodiment further includes a bit stream generation circuit 607 for generating a bit stream including N bands of the quantized audio data, N bands of bit assignment data, and N band of magnifications. A transmission circuit 608a transmits the bit stream.

In this embodiment, grouping the audio data is provided with the combining filter 604, so that delay which may be provided in the processing of grouping is prevented.

<FOURTH EMBODIMENT>

Figure 6:
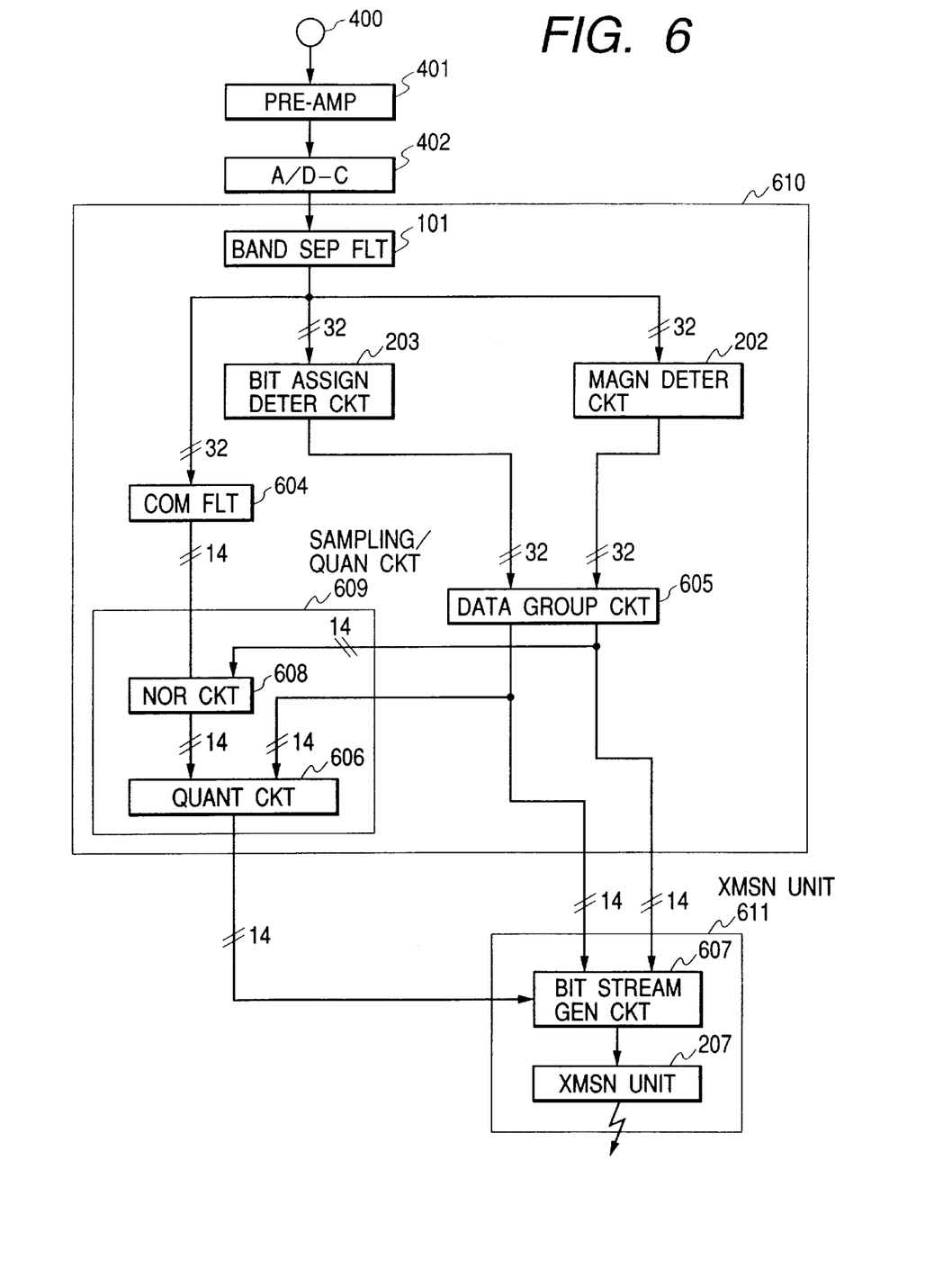
FIG. 6 is a block diagram of a wireless microphone unit according to a fourth embodiment.

FIG. 6 is a block diagram of a wireless microphone unit according to a fourth embodiment.

The wireless microphone unit of the fourth embodiment includes the pre-amplifier 401, the a/d converter 402, and the transmission circuit 207 (used in the second embodiment) in addition to the audio signal coding circuit 610 of the third embodiment. The sound is received by the microphone 400 to output a sound signal, the pre-amplifier 401 amplifies the sound signal, the a/d converter 402 a/d-converts the sound signal from the pre-amplifier 401 into audio data, the audio signal coding circuit 610 codes and compresses the audio data in accordance with frequency resolution of the human being to generate a compressed audio data, and the transmission unit 611 transmits the compressed audio data.

<FIFTH EMBODIMENT>

Figure 7:
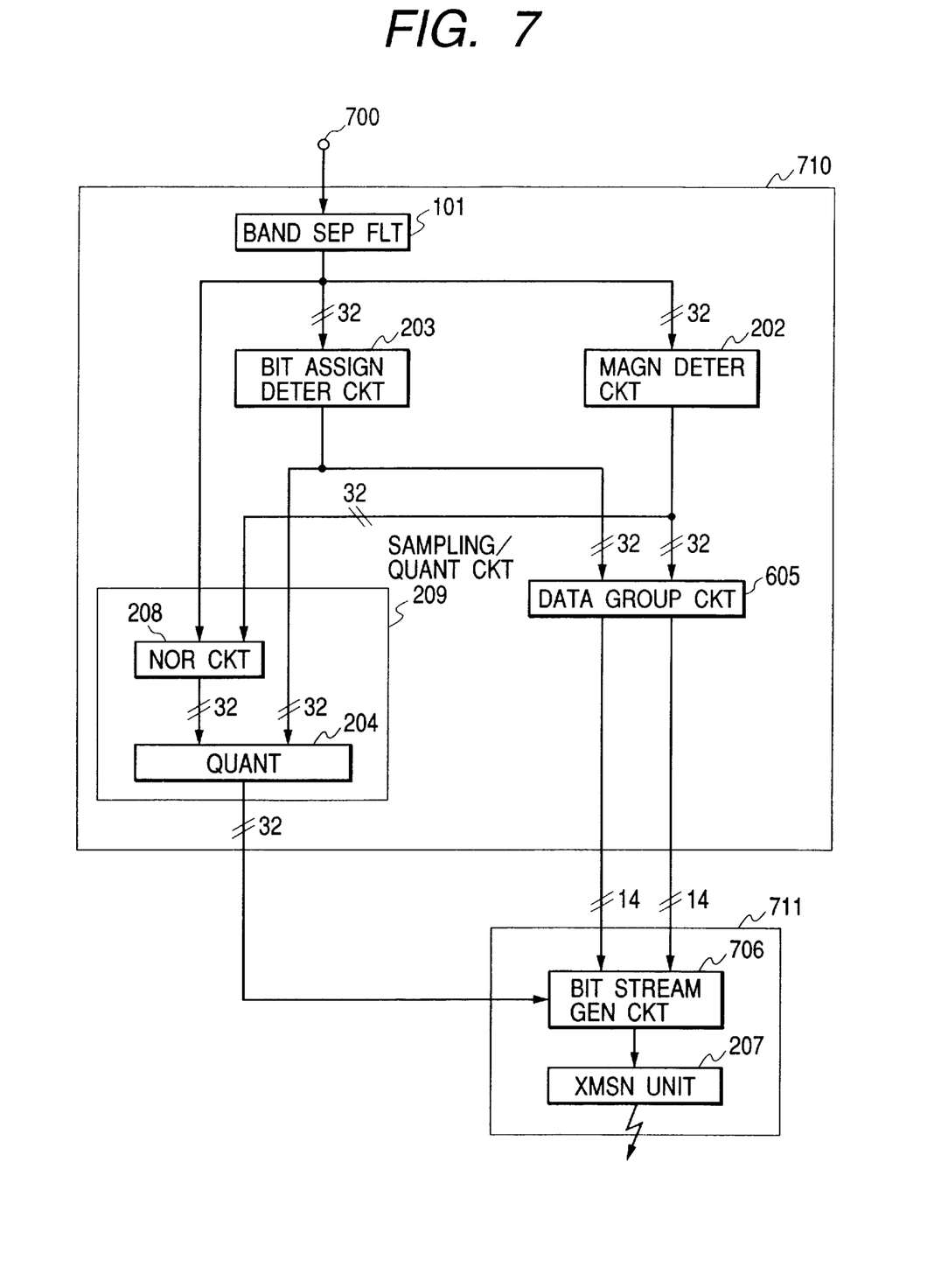
FIG. 7 is a block diagram of an audio signal coding circuit of a fifth embodiment.

FIG. 7 is a block diagram of an audio signal coding circuit of a fifth embodiment.

The audio signal coding circuit 710 of the fifth embodiment includes a band-separating filter 101 for processing a digital audio signal from an input terminal 700 to provide M bands of audio data separated at a regular frequency interval, the magnification determining circuit 202 for detecting M bands of maximum levels of M bands of the audio data and determining M bands of magnifications in accordance with M bands of the maximum levels, the bit assignment determining circuit 203 for determining bit assignment and generating M bands of bit assignment data for quantizing in accordance with M bands of the audio data, and a data grouping circuit 605 (which is used in the fourth embodiment) groups M (32) bands of magnifications into N bands of magnifications and groups M (32) bands of the bit assignment data into N (14) bands of assignment data, the normalizing circuit 208 for normalizing M bands of the audio data from the band separation filter 101 in accordance with M bands of magnifications from the magnification determining circuit 202, a quantizing circuit 204 quantizes M bands of the audio data from the normalizing circuit 208 in accordance with M bands of bit assignment data from the bit assignment determining circuit 203. The bit stream generation circuit 706 generating a bit stream including the M (32) bands of the audio data, N bands of magnifications and N bands of assignment data. The transmission circuit 207 transmits the bit stream.

A audio decoder receiving this bit stream may include a circuit for converting N band s of magnification data into M bands of magnification data for de-normalizing.

In this embodiment, grouping the audio data is omitted, so that delay which may be provided in processing of grouping is prevented.

<SIXTH EMBODIMENT>

Figure 8:
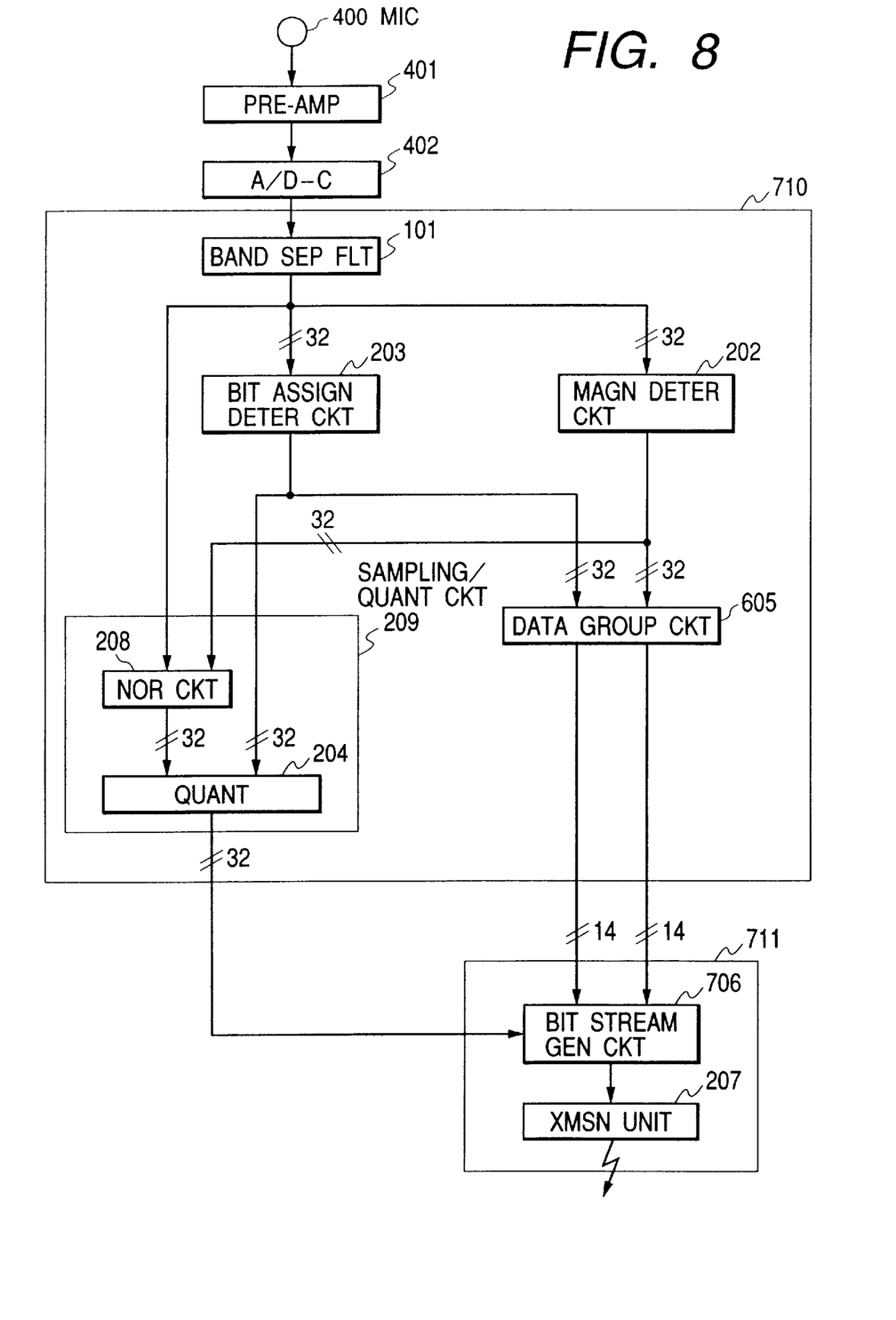
FIG. 8 is a block diagram of a wireless microphone unit according to a sixth embodiment.

FIG. 8 is a block diagram of a wireless microphone unit according to a sixth embodiment.

The wireless microphone unit of the sixth embodiment includes the pre-amplifier 401, the a/d converter 402, and the transmission circuit 207 in addition to the audio signal coding circuit 710 of the fifth embodiment. The sound is received by the microphone 400 to output a sound signal, the pre-amplifier 401 amplifies the sound signal, the a/d converter 402 a/d-converts the sound signal from the pre-amplifier 401 into audio data, the audio signal coding circuit 710 codes and compresses the audio data in accordance with frequency resolution of the human being to generate a compressed audio data, and the transmission unit 711 transmits the compressed audio data.

As mentioned, this invention provides high efficiency (low bit rate) transmission with a high sound quality by compressing the audio signal using the frequency resolution of the human being.

What is claimed is:

1. A wireless microphone comprising:
   a microphone for receiving a sound to generate a sound signal;
   an aid converter for a/d-converting said sound signal into audio data;
   compressing means for compressing said audio data in accordance with frequency resolution of the human being to generate compressed audio data, said compressing means including:
      band separating means for separating said audio data into M bands of audio data;
      quantizing means for quantizing M bands of said audio data, and
      data grouping means for grouping M bands of said audio data to output N bands of said audio data as said compressed audio data in accordance with frequency resolution of the human being, M and N being natural numbers more than one, M>N; and
   transmitting means for transmitting said compressed audio data, wherein said M and N bands each include the same amount of data.

2. A wireless microphone comprising:

a microphone for receiving a sound to generate a sound signal;

an a/d converter for a/d-converting said sound signal into audio data;

band separating means for separating said audio data into M bands of audio data;

bit assignment determining means for determining bit assignment and generating M bands of bit assignment data in accordance with M bands of said audio data, respectively;

magnification determining means for detecting M bands of maximum levels of M bands of said audio data and determining M bands of magnification data in accordance with M bands of said maximum levels, respectively;

data grouping means for grouping M bands of said magnifications into N bands of said magnification data and grouping M bands of said bit assignment data into N bands of said assignment data to output N bands of said magnification data and N bands of said assignment data;

combining means for combining M bands of said audio data into N bands of audio data;

normalizing means for normalizing N bands of said audio data from said band separating means in accordance with N bands of said magnification data; and quantizing means for quantizing N bands of said audio data in accordance with N bands of said bit assignment data to output said quantized N bands of said audio data, M and N being natural numbers more than one, M>N.

3. A wireless microphone comprising:

a microphone for receiving a sound to generate a sound signal;

an a/d converter for a/d-converting said sound signal into an audio data;

band separating means for separating a digital audio signal into M bands of audio data;

magnification determining means for detecting M bands of maximum levels of M bands of said audio data and determining M bands of magnification data in accordance with M band of said maximum levels, respectively;

normalizing means for normalizing M bands of said audio data from said band separating means in accordance with M bands of magnification data, respectively;

bit assignment determining means for determining bit assignment and generating M bands of bit assignment data in accordance with M bands of said audio data, respectively;

quantizing means for quantizing M bands of said audio data in accordance with M bands of said bit assignment data to output M bands of said quantized audio data, respectively; and data grouping means for grouping M bands of said magnification data into N bands of magnification data and grouping M bands of said bit assignment data into N bands of assignment data to output N bands of said magnification data and N bands of said assignment data, M and N being natural numbers more than one, M>N.

* * * * *